(12) United States Patent
Sokolov et al.

(10) Patent No.: US 10,198,807 B2
(45) Date of Patent: Feb. 5, 2019

(54) TAGGING OF MATERIALS AND GOODS WITH PARTICLES OF COMPLEX SHAPES AND/OR FLUORESCENT SPECTRA

(71) Applicants: Igor Sokolov, Medford, MA (US); Yuri Liburkin, Annapolis, MD (US)

(72) Inventors: Igor Sokolov, Medford, MA (US); Yuri Liburkin, Annapolis, MD (US)

(73) Assignee: Nanoscience Solutions LLC, Arlington, VA (US)

( * ) Notice: Subject to any disclaimer, the term of this patent is extended or adjusted under 35 U.S.C. 154(b) by 246 days.

(21) Appl. No.: 15/222,543

(22) Filed: Jul. 28, 2016

(65) Prior Publication Data

US 2017/0032508 A1  Feb. 2, 2017

Related U.S. Application Data

(60) Provisional application No. 62/282,205, filed on Jul. 29, 2015.

(51) Int. Cl.
*G06T 7/00* (2017.01)
*G06K 9/00* (2006.01)

(52) U.S. Cl.
CPC .......... *G06T 7/001* (2013.01); *G06K 9/00577* (2013.01); *G06T 2207/10056* (2013.01)

(58) Field of Classification Search
CPC .......... G06T 7/001; G06T 2207/10056; G06K 9/00577
USPC .......................................................... 382/108
See application file for complete search history.

(56) References Cited

U.S. PATENT DOCUMENTS 8,659,391 B2 * 2/2014 Pradeep ............ B82Y 30/00
162/140

\* cited by examiner

*Primary Examiner* — Amandeep Saini
(74) *Attorney, Agent, or Firm* — Nadya Reingand; Yan Hankin

(57) ABSTRACT

This invention comprises methods, systems, and devices for tagging objects with one or more particles of complex geometry, individually and in combination. The particles are created via the process of either artificial or biological/natural self-assembly and are used for tagging or labeling various goods in order to identify those goods. The particles may be used individually or in combination as a plurality of particles which are scattered or positioned in a pattern. For example, the use of ultrabright fluorescent silica particles comprising complex optical fluorescent spectra and/or geometrical shapes to tag and authorize objects is disclosed. Application methods and materials are disclosed as well as methods and devices for detecting and decoding resulting tags or labels.

20 Claims, 2 Drawing Sheets

TAGGING OF MATERIALS AND GOODS WITH PARTICLES OF COMPLEX SHAPES AND/OR FLUORESCENT SPECTRA

CROSS REFERENCE TO RELATED APPLICATIONS

The current application claims priority to U.S. provisional application 62/282,205, filed on Jul. 29, 2015, which is fully incorporated herein by reference. The current application also relates to U.S. Pat. No. 8,883,038, filed on Jul. 5, 2007, which is fully incorporated herein by reference.

FIELD OF THE INVENTION

The present invention relates to tagging and labeling materials and goods to prevent counterfeiting, to prevent the use of incorrect/prohibited materials and goods (for example, explosive materials or electronic parts of inappropriate origin), and to prevent incorrect handling and shipping. The present invention also relates to tagging and labeling materials and goods to support the use and identification of appropriate materials or goods, to enhance quality control, to utilize the particles for labeling fluids in geological explorations, and to utilize the particles in remediation efforts.

BACKGROUND OF THE INVENTION

Color and fluorescent tagging of goods and materials are popular methods used to identify particular items for various purposes. Known methods are disclosed in, e.g., U.S. Pat. No. 8,403,223 B2, U.S. Pat. No. 5,592,561, US 2009/0045360, and US 2003/0177941. Potential applications include, but are not limited to, preventing counterfeiting, using incorrect/prohibited materials and goods (for example, explosive materials or electronic parts of inappropriate origin), preventing incorrect handling and shipping, supporting the use and identification of appropriate materials or goods, enhancing quality control, using the particles for labeling fluids in geological explorations and using the particles in remediation efforts. Despite substantial efforts to develop reliable security labelling and tagging, it is very difficult to create anti-counterfeiting that is virtually impossible to copy.

SUMMARY OF THE INVENTION

The present invention comprises a method for tagging and authorizing an object, comprising the steps of applying a combination of particles created via the process of either artificial or biological/natural self-assembly onto the object, particles having at least one of a different fluorescent spectrum, shape, and/or size; obtaining one or more images of the particles; measuring a first tagging characteristic of each particle, the first tagging characteristic comprising particle spectra; measuring a second tagging characteristic of each particle, the second tagging characteristic comprising particle shapes; measuring a third tagging characteristic of each particle, the third tagging characteristic comprising particle sizes; measuring a fourth tagging characteristic, the fourth tagging characteristic comprising each particle's mutual position with relation to each other particle; and authorizing the object when all four tagging characteristics, or either of the characteristics which are present, are within a predetermined expected range, both individually and/or in combination. In some aspects, the method comprises at least 2 particles. In some aspects the method comprises at least three or more particles. Each of the particles in any embodiment may or may not have a different shape, location, size, and/or spectrum.

In some aspects, the measurements of the particle geometry and sizes are obtained via optical microscopy or a digital camera with microscopic attachment, for example, a smart phone camera with or without microscopic attachment.

In some aspects, the measuring and authorizing steps are performed by a processor running an algorithm.

In some aspects, the particles are assembled in a process of templated sol gel self-assembly.

In some aspects, the particles are ultrabright fluorescent silica particles.

In some aspects, the particles are obtained naturally.

In some aspects, the particles are diatoms.

In some aspects, the particles comprise a mixture of particles obtained artificially and particles obtained via natural self-assembly.

In some aspects, the authorizing step further comprises identifying the object through recognition of a geometry of one or more individual particles.

In some aspects, the authorizing step further comprises identifying the object through measuring a distance between two or more particles in two or more clusters.

In some aspects, the one or more images of the particles are obtained via an optical microscope or an optical camera with a macro attachment.

In some aspects, the algorithm is a navigation algorithm.

In some aspects, the authorizing step further comprises identifying the object through recognition of one or more optical spectra associated with said combination of particles.

In some aspects, a spectrometer is used to record the one or more optical spectra.

In some aspects, the one or more recorded optical spectra are analyzed using a computer algorithm.

In some aspects, the computer algorithm comprises a multiplexing spectral analysis of various fluorescent spectra.

In some aspects, the authorizing step further comprises identifying the object through recognition of an optical color rather than an optical spectrum or optical spectra.

In some aspects, a smart phone is used to obtain said one or more images.

In some aspects, the applying step comprises dispersing the particles in an optically transparent medium, and then applying the medium over the surface or packaging of the object.

In some aspects, the transparent medium is epoxy.

In some aspects, each particle has a size of 1-500 microns. In the preferred embodiment, each particle has a size of in the range between 10-100 microns.

DETAILED DESCRIPTION OF THE INVENTION

Definitions

"Self-assembly," as used herein, refers to the process of either artificial or biological/natural self-assembly. Self-assembly is defined as a phenomenon where the components of a system assemble themselves spontaneously via an interaction to form a larger functional unit. This spontaneous organization can be due to direct specific interaction and/or indirectly through their environment. The difference in the energy of association of components is typically comparable to thermal energy [see e.g., Dekker Encyclopedia of Nanoscience and Nanotechnology, Volume 2, 2004, By James A. Schwarz, Cristian I. Contescu, Karol Putyera; p. 1511; ISBN-10: 0824750489]. A specific feature of self-assembly critical to the present invention is the trivial nature and high complexity of the geometry and internal structure of the assembled shapes/particles. Furthermore, the resulting high complexity of fluorescence spectra obtained within the ultrabright fluorescent silica particles may also be configured or otherwise used to perform identification/authorization of objects as described herein. The resulting complexity may be due to, e.g., the ultrabright fluorescent silica particles comprising multiple encapsulated fluorescent dyes.

"Navigation algorithms," or "algorithms for navigation," as used herein, are defined as the algorithms for recognition of position of individual dot-like objects, for example, stars. An example of such algorithms is the family of algorithms used for celestial navigation, see for example, the description in "Celestial Navigation: A Complete Home Study Course" by David Burch and Tobias Burch (Publisher: Starpath Publications; Second Edition edition (Mar. 11, 2015) ISBN-10: 0914025465).

"Multiplexing spectral analysis," as used herein, is defined as the family of algorithms used to find individual components contributing to the total spectrum. An example of a complex signal analysis algorithm can be found in "Analysis and Simulation of a Digital Mobile Channel Using Orthogonal Frequency Division Multiplexing" by L. J. Cimini IEEE TRANSACTIONS ON COMMUNICATIONS, VOL. COM-33, NO. 7, JULY-1985. The example of multiplexing spectral analysis can be found in Raman spectroscopy (for example, "Spectral analysis of multiplex Raman probe signatures" by Lutz B R, Dentinger C E, Nguyen L N, Sun L, Zhang J, Allen A N, Chan S, Knudsen B S, ACS Nano 2008 Nov. 25; 2(11):2306-14. doi: 10.1021/nn800243g.). Another example is the use of the algorithms utilized in flow cytometry (for example, "Multiplexed microsphere-based flow cytometric assays," by Kathryn L Kellar and Marie A Iannone, Experimental Hepatology Volume 30, Issue 11, November 2002, pp. 1227-1237).

Figure 1:
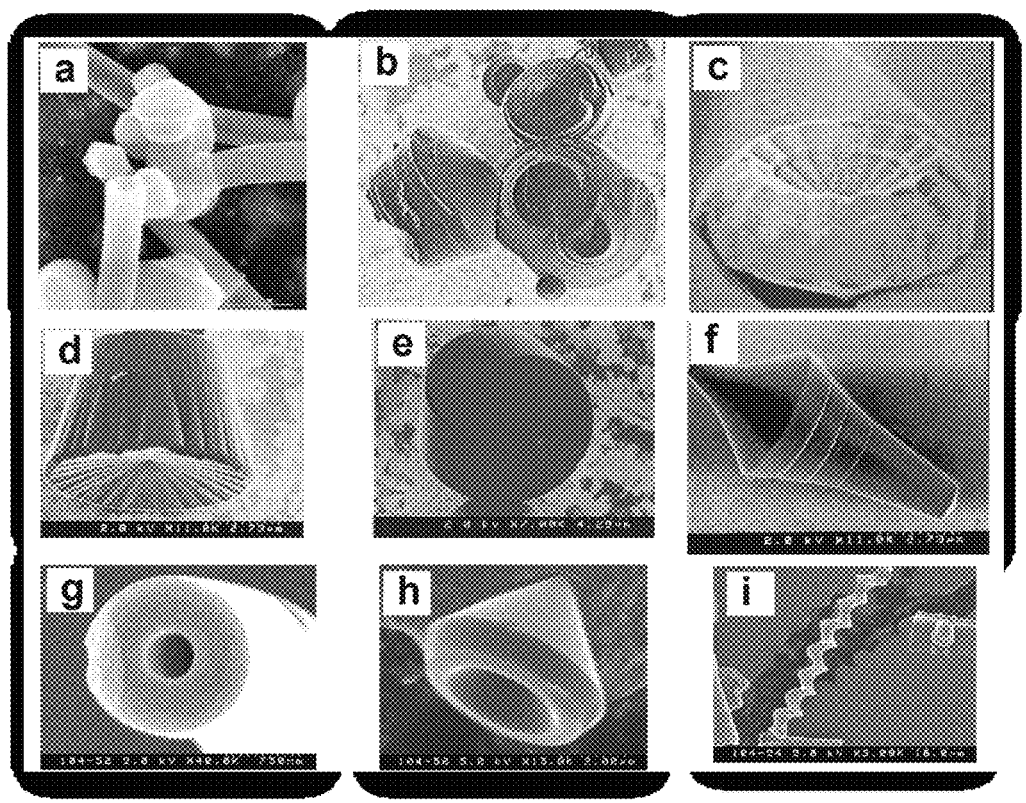
FIG. 1 shows an example of nontrivial shapes of particles self assembled in the process of templated sol gel assembly.

One embodiment of this invention is the use of particles of complex geometry which are created in the process of self-assembly either of artificial or biological nature. The said particles can be modified to become fluorescent if needed. A first embodiment of this invention is in the use of such particles to tag and authorize secure objects because the particles have a unique and random geometry. Possession of such geometry is a result of self-assembly processes of either artificial nature (assembled by humans) or biological nature (assembled by natural processes). Because the free energy required for the assembly of such particles is typically comparable with the energy of the Brownian motion, the resulting particle geometry has a random statistical nature. This is somewhat analogous to all humans having unique fingerprints. FIG. 1 illustrates examples of multimicron silica particles created in the process of templated sol gel self-assembly. Diatoms is another nonrestrictive example of particles created via biological self-assembly to be used in the method of the present invention. A nonlimiting example of the present invention comprises particles which are colloids, synthesized in the process of self-assembly, in a natural or artificial environment. Furthermore, the particles do not have a round geometry (round colored particles have been used in prior art for security tagging; however, because of their trivial round shape, the particle geometry was not considered to be or used as one of the tagging characteristics).

Another embodiment of this invention is the use of ultrabright fluorescent silica particles. Ultrabright fluorescent silica particles were recently patented as published in U.S. Pat. No. 8,883,038, the disclosure of which is fully incorporated herein. Disclosed herein are uses of such ultrabright fluorescent particles for tagging and labelling, particular application methods and materials, and methods and apparata for detecting and decoding the tags created with the help of said particles.

The present invention deals with the use of particles of complex optical fluorescent spectra and/or geometrical shapes for the purpose of tagging and labeling various goods. Said tagging and labeling is achieved by the use of one or more of the following unique properties of said particles: unique fluorescent spectrum, unique particle shapes, unique distribution and/or orientation of individual particles, and/or unique distribution and geometry of particle aggregates or clusters (i.e., aggregates of several particles together forming clusters, the relationship of particles within each cluster, and the relationship between those clusters).

The ultrahigh fluorescent brightness of the particles permits the use of a small amount of particles (typically invisible to the naked eye) and/or utilization of a relatively inexpensive apparatus for detecting the tags obtained via use of said particles. The terms "ultra high fluorescent brightness" and "ultrabright fluorescent" may be used interchangeably throughout this disclosure.

These ultrabright fluorescent particles can be prepared in a manner that produces very complex fluorescent spectra emitted from each particle. The uniqueness of such a spectrum makes it virtually impossible to wrongfully reproduce. The taggant composition of this invention includes ultrabright fluorescent silica particles, which are fluorescent visible or invisible (near infrared) parts of the optical spectrum. It is important to note that the ultrabright fluorescent silica spectra are impossible to obtain with prior art fluorescent taggants (for example, various dyes and nanoparticles, including quantum dots and rare earth phosphors, do not have the capability of creating such fluorescent spectra as the particles used by the method of the present invention).

Furthermore, the particles may be produced in a manner that provides highly nontrivial geometric shapes which are visible with the help of an optical microscope with or without a digital camera, or a digital camera with macroscopic attachment, or a digital camera built in a smartphone. Detecting this geometry and mutual orientation/location of the particles embedded in a transparent label or mark can be used as a unique method. In a preferred embodiment, the method comprises particles which are micron-particles (i.e. particles ranging in size from 1-500 microns), created in the process of soft matter or biological self assembly. It should be noted, that it is not possible to perform optical microscopy on nanoparticles, and thus the smaller size of the particles of the present invention is a critical factor for the method disclosed herein. This is not to say, however, that initial orientation may begin on the micron-level, or even the centimeter-level, with the use of other imaging technology or method.

FIG. 1 shows an example of complex shapes of particles self assembled in the process of templated sol gel assembly.

The examples shown in FIG. 1 are of (a) tubes, (b) discoids with protrusions, (c) "seashell", (d) discoid of sunken shape, (e) "Moebius strip" shape, (f) spin, (g) fat tube, (h) cone, and (i) helix. The size of each particle can range from one micron (e.g., discoids) to 500 microns (e.g., helices). Scanning electron microscopy images are shown. It is noted that these particles can be made fluorescent as described in U.S. Pat. No. 8,883,038.

In addition to the unique geometry of individual particles at the microscale, the particles may form patterns assembled from either individual particles or their aggregates in some transparent label or mark. These patterns can be detected at the macroscale (in the other words, seen and or recorded with a regular digital camera without the need in a microscope or microscopic lens attachment). Any combination of particles may form a unique tag for a particular object. Furthermore, the combinations of particles may form clusters of a plurality of particles. And even further, a combination of clusters may form a specific and unique pattern creating a macrogeometry. This can serve as an additional security component.

For the purpose of tagging and labeling, the particles can be sprayed or glued onto an object. Alternatively, the particles can be embedded (i.e. dispersed) in any carrying medium. This medium can then be applied over the surface of materials and goods or their packaging. In some cases the particles can be added directly to a subject fluid.

Figure 2:
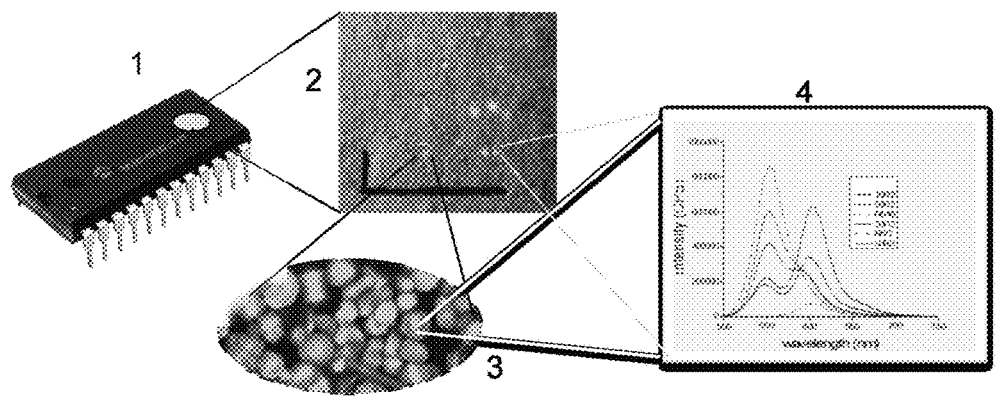
FIG. 2 shows an example of ultrabright fluorescent particles of nontrivial spectra and geometrical shape.

FIG. 2 shows an example of ultrabright fluorescent particles of nontrivial spectra and geometrical shape and how those particles may be used to identify varying levels of security. Dry particles can be dispersed in a variety of media which can then be applied to the materials and goods to make tags and labels. As a nonrestrictive example, the particles are dispersed in a two-component epoxy glue, and applied to a product (1). The particles were imaged using a regular cell phone (iPhone 6 plus was used in this example) to reveal a macroscopic arrangement of particle clusters (2). Using a microscope attachment, individual particles were imaged (3). The spectra, which can be obtained either from macroscopic clusters or individual microparticles are shown (4). Several examples of different spectra of ultrabright fluorescent particles recorded with a fiber-optic spectrometer are shown (4). Each of the spectra and/or particular combinations of spectra can be indicative of a particular product.

The spectra can be read with regular spectrometers or photosensitive cameras (i.e. cameras which can sense light of particular wavelengths), a nonrestrictive example being a regular digital camera or cell phone with an optical filter. In other cases, optical microscopy or other optical imaging is used to collect images of the particles. In some simplified cases, reading the color might be sufficient instead of reading the full spectrum. Color reading can be performed by multiple devices, for example smart phones which use special applications for reading colors (as a nonrestrictive example, the algorithms by Home Depot or other paint color matching services used to match a particular color can be used). Location/orientation of the particles can be recorded with a digital micro camera (including, as the nonrestrictive example shown in FIG. 2, some cell phones with digital cameras with or without a special microscopic lens attachment). The levels of security can be recorded with a device (the reader) which combines a digital camera with filters and/or spectrometers. The spectra can be recognized through computer algorithms by comparing it against information stored in a database. The recognition algorithms can be of the family used in multiplexing spectral analysis.

The processing of data obtained with said reader can also be performed with the help of standard algorithms. As a nonrestrictive example, orientation and location of the particles can be found with algorithms used in astronomy for navigation, navigation algorithms.

Figure 3:
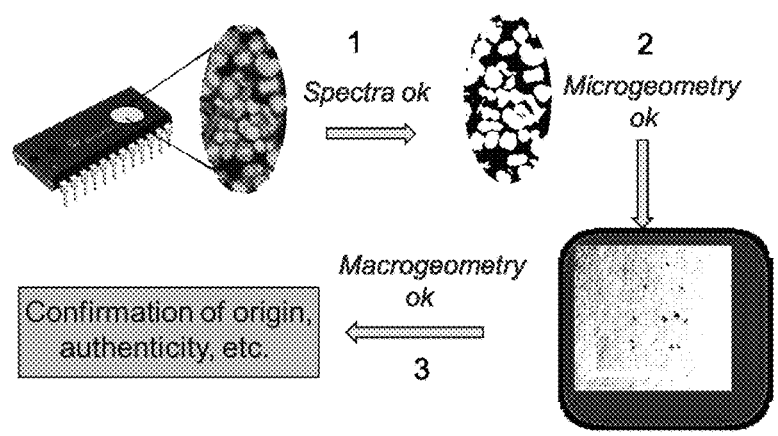
FIG. 3 shows an example of the algorithmic processes for an indication of spectra, an indication of microgeometry, and an indication of locations of macro clusters of particles.

FIG. 3 shows an example of the algorithmic process of an indication of spectra, microgeometry, and location of macro clusters of particles (i.e. three levels of security). The particles' spectra are verified (step 1), then the microgeometry (orientation, shape, location, and fluorescent intensity) of the particles are verified with respect to a predefined tag (step 2), and then the macroscopic geometry (shape, location, and fluorescent intensity) of the particle clusters is verified (step 3). The order and necessity of steps 1, 2, and 3 is interchangeable depending upon specific applications and users. The database for verification/authorization of the spectra and particle geometry/location can be pre-loaded to special readers or be made available through connection to a remote server (e.g., via the Internet).

The taggant composition (according to one embodiment of this invention) may further include a medium to disperse ultrabright fluorescent particles for subsequent attachment to goods and materials by making labels and tags. In the case of tracing, the particles can be dispersed directly in the medium of interest (for example, water).

Another nonrestrictive example is dispersing the particles in a glue which does not degrade the particles. For example, epoxy glue may be used. After being mixed with epoxy, the ultrabright fluorescent particles can then be spread over a material or its packaging. The random orientation of the particles produced in such a process will then be the code individually labelling the particular product.

Another type of random disposition can be created by using a spray. The medium of the spray will dry and attach the particles to the surface of the product, material, or its packaging.

The particles can also be added as a component to ink in injection printing systems. The use of a printing system to create various tags and labels should be obvious to one skilled in the art. The same can be applied to toners of laser printers.

The unique size, geometry, and fluorescent characteristics of the particles, either separately or in combination of thereof can be used for environmental tracing of spills and liquids. The particles of high fluorescent brightness and small size (the preferred example is close to 1 µm in size) are preferred to use in such applications. It is further noted that various existing methods used to digitalize patterns and geometries may be used to measure the particles' shapes, locations, sizes, etc. Such existing methods would be obvious to one skilled in the art of this invention.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for tagging and identifying an object, comprising:
    applying a combination of particles at least one of onto or in the object, each particle having at least one of a measurable shape, location, size, or spectrum, wherein the particles are obtained via artificial self-assembly or natural self-assembly,
        wherein the particles include at least one of:
            one or more encapsulated fluorescent dyes, or
            a particle having a complex shape,
    obtaining one or more images of said particles,
    measuring a first tagging characteristic of each particle, the first tagging characteristic comprising particle shapes,
    measuring a second tagging characteristic of each particle, the second tagging characteristic comprising particle sizes,
    measuring a third tagging characteristic, the third tagging characteristic comprising each particle's mutual position with relation to each other particle,
    measuring a fourth tagging characteristic of each particle, the fourth tagging characteristic comprising particle spectra, and
    identifying the object when either each of said four tagging characteristics or combinations thereof are within an expected range.

2. The method of claim 1, wherein said one or more images are obtained via optical microscopy or an optical camera with a macro attachment.

3. The method of claim 1, wherein said measuring and identifying steps are performed by a computer processor running an algorithm.

4. The method of claim 3, wherein said algorithm is an algorithm of the family of navigation algorithms.

5. The method of claim 1, wherein the particles are assembled in a process of templated sol gel chemistry.

6. The method of claim 1, wherein the particles are obtained via natural self-assembly.

7. The method of claim 6, wherein the particles are diatoms.

8. The method of claim 1, wherein the particles are ultrabright fluorescent silica particles.

9. The method of claim 8, wherein the particles comprise multiple encapsulated fluorescent dyes.

10. The method of claim 1, wherein the identifying step further comprises identifying the object through recognition of a geometry of one or more individual particles.

11. The method of claim 1, wherein the identifying step further comprises identifying the object through measuring a distance and angles between two or more particles in two or more clusters.

12. The method of claim 1, wherein said identifying step further comprises identifying the object through recognition of one or more optical spectra associated with said combination of particles.

13. The method of claim 12, wherein a spectrometer is used to record the one or more optical spectra.

14. The method of claim 12, wherein the one or more recorded optical spectra are analyzed using a computer algorithm.

15. The method of claim 14, wherein said computer algorithm comprises a multiplexing analysis of various spectra.

16. The method of claim 1, wherein said identifying step further comprises identifying the object through recognition of an optical color.

17. The method of claim 1, wherein said applying step comprises:
    dispersing said particles in an optically transparent medium, and
    applying said medium over the surface or packaging of the object.

18. The method of claim 17, wherein the transparent medium is epoxy.

19. The method of claim 1, wherein each particle has a size of 1-500 microns.

20. The method of claim 1, wherein the combination of particles comprises two or more fluorescent spectra.

* * * * *